(12) United States Patent
Gill

(10) Patent No.: US 6,445,552 B1
(45) Date of Patent: Sep. 3, 2002

(54) SHIELD DESIGN FOR STABLE MAGNETORESISTIVE HEAD

(75) Inventor: Harry S. Gill, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/507,535

(22) Filed: Feb. 18, 2000

(51) Int. Cl.[7] ................................................. G11B 5/39
(52) U.S. Cl. ................................. 360/319; 360/324.12
(58) Field of Search .............................. 360/319, 324.1, 360/324.11, 324.12

(56) References Cited

U.S. PATENT DOCUMENTS

| | | | |
|---|---|---|---|
| 5,696,656 A | * 12/1997 | Gill et al. | 360/319 |
| 5,768,067 A | 6/1998 | Saito et al. | 360/113 |
| 5,784,225 A | 7/1998 | Saito et al. | 360/113 |
| 5,850,325 A | * 12/1998 | Miyauchi et al. | 360/319 |
| 5,869,963 A | 2/1999 | Saito et al. | 324/252 |
| 5,874,886 A | 2/1999 | Araki et al. | 338/32 R |
| 5,898,548 A | * 4/1999 | Dill et al. | 360/324.2 |
| 6,061,210 A | * 5/2000 | Gill | 360/319 |
| 6,198,609 B1 | * 5/2001 | Barr et al. | 360/322 |
| 6,243,241 B1 | * 6/2001 | Kanai | 360/324.11 |

OTHER PUBLICATIONS

"TTB: Barkhausen Noise Quantification Using a Derivative Approximation", IBM Technical Disclosure Bulletin, Nov. 1991, pp 460–465.

* cited by examiner

Primary Examiner—Jefferson Evans
(74) Attorney, Agent, or Firm—Blakely, Sokoloff, Taylor & Zafman

(57) ABSTRACT

A multilayer structure is disclosed having a magneto resistive free layer. The multilayer structure is between a pair of shields and the shields are separated by at least two spacings. A first of the spacings is at least the length of the multilayer structure. A second of the spacings is greater than the first spacing.

20 Claims, 5 Drawing Sheets

SHIELD DESIGN FOR STABLE MAGNETORESISTIVE HEAD

FIELD OF THE INVENTION

The field of invention relates to direct access data storage, generally. More specifically, the invention relates to compensating for the effect of image poles within a magnetic head.

BACKGROUND

Hardware systems often include memory storage devices having media on which data can be written to and read from. A direct access storage device (DASD or disk drive) incorporating rotating magnetic disks are commonly used for storing data in magnetic form. Magnetic heads, when writing data, record concentric, radially spaced information tracks on the rotating disks.

Magnetic heads also typically include read sensors that read data from the tracks on the disk surfaces. In high capacity disk drives, magnetoresistive (MR) read sensors, the defining structure of MR heads, can read stored data at higher linear densities than thin film heads. An MR head detects the magnetic field(s) through the change in resistance of its MR sensor. The resistance of the MR sensor changes as a function of the direction of the magnetic flux that emanates from the rotating disk.

One type of MR sensor, referred to as a giant magnetoresistive (GMR) effect sensor, takes advantage of the GMR effect. In GMR sensors, the resistance of the MR sensor varies with direction of flux from the rotating disk and as a function of the spin dependent transmission of conducting electrons between magnetic layers separated by a non-magnetic layer (commonly referred to as a spacer) and the accompanying spin dependent scattering within the magnetic layers that takes place at the interface of the magnetic and non-magnetic layers.

GMR sensors using two layers of magnetic material separated by a layer of CMR promoting non-magnetic material are generally referred to as spin valve (SV) sensors. In an SV sensor, one of the magnetic layers, referred to as the pinned layer, has its magnetization direction "pinned" via the influence of exchange coupling with an antiferromagnetic layer. Due to the relatively high internal anisotropy field associated with the pinned layer, the magnetization direction of the pinned layer typically does not rotate from the flux lines that emanate from the rotating disk. The magnetization direction of the other magnetic layer (commonly referred to as a free layer), however, is free to rotate with respect to the flux lines that emanate/terminate from/to the rotating disk.

FIG. 1 shows a prior art SV sensor structure 100 where the pinned layer is implemented as a structure 120 having two ferromagnetic films 121, 122 (also referred to as MP2 and MP1 layers, respectively) separated by a non ferromagnetic film 123 (such as ruthenium Ru) that provides antiparallel coupling of the two ferromagnetic films 121, 122. Sensor structures such as that 100 shown in FIG. 1 are referred to as AP sensors in light of the antiparallel magnetic relationship between films 121, 122. Similarly, structure 120 may also be referred to as an AP layer 120.

FIG. 1 shows an AP sensor 100 comprising a seed layer 102 formed upon a gap layer 101. The seed layer 102 helps properly form the microstructure of the antiferromagnetic (AFM) layer 105. Over seed layer 102 is a free layer 103. The antiferromagnetic (AFM) 105 layer is used to pin the magnetization direction of the MP2 layer 121. MP1 layer 122 is separated from free layer 103 by spacer layer 104. Note that free magnetic layer 103 may be a multilayer structure having two or more ferromagnetic layers.

A problem with structures such as the sensor 100 shown in FIG. 1, is the stability of the free layer 103 as sensor dimensions are continually reduced.

SUMMARY OF INVENTION

A multilayer structure is disclosed having a magneto resistive free layer. The multilayer structure is between a pair of shields and the shields are separated by at least two spacings. A first of the spacings is at least the length of the multilayer structure. A second of the spacings is greater than the first spacing.

BRIEF DESCRIPTION OF THE DRAWINGS

The present invention is illustrated by way of example, and not limitation, in the Figures of the accompanying drawings in which:

FIG. 2b shows an isolated view of the free layer of FIG. 2a.

FIGS. 3 shows flux lines and image charges associated with the shield layers of FIG. 2a.

DETAILED DESCRIPTION

A multilayer structure is disclosed having a magneto resistive free layer. The multilayer structure is between a pair of shields and the shields are separated by at least two spacings. A first of the spacings is at least the length of the multilayer structure. A second of the spacings is greater than the first spacing.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 2A:
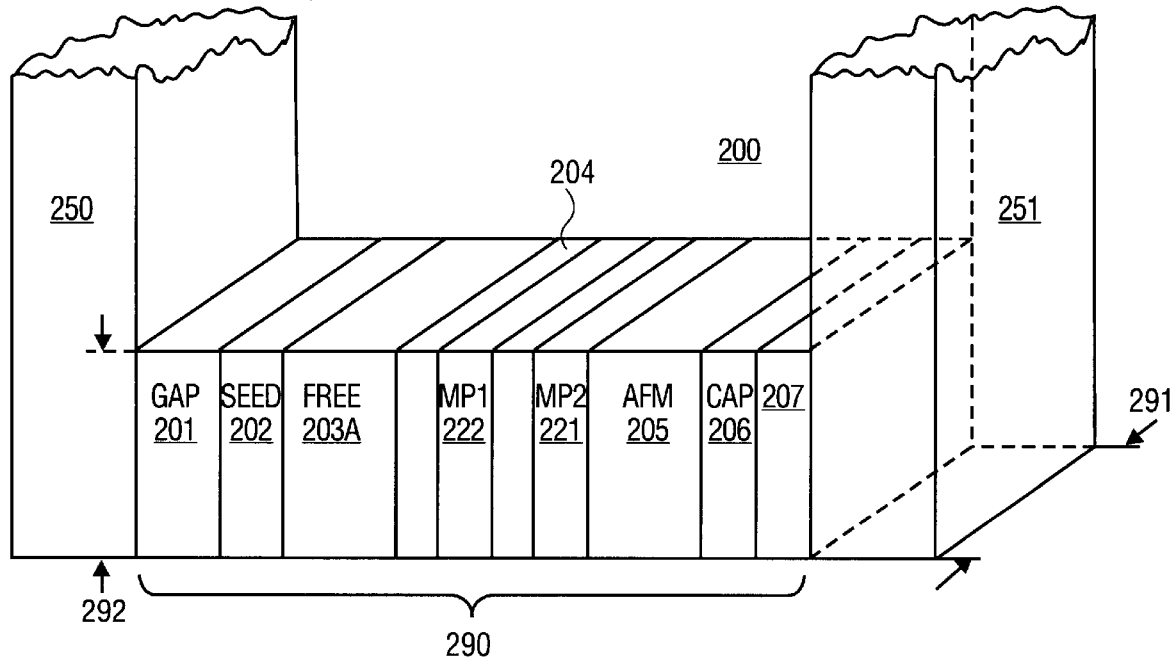
FIG. 2a shows the track width and stripe height associated with the prior art AP sensor of FIG. 1.

Referring to FIG. 2a, recall from the background that a problem with sensors such as sensor 200 is the stability of the free layer 203a as track dimensions continually narrow. For example, in some cases as track widths 291 fall below 0.50 µm, the direction that the free layer 203a magnetization points toward can "jump" between the +x direction and the −x direction (and vice versa) as the sensor passes over a disk (lying in the xy plane) having flux lines emanating/terminating in the + and − z directions. This jumping activity is an undesireable instability FIG. 2a does not show the disk or its flux lines for simplicity; however briefly looking at FIG. 3, one can see a disk 371 and its associated flux lines 370.

Figure 2B:
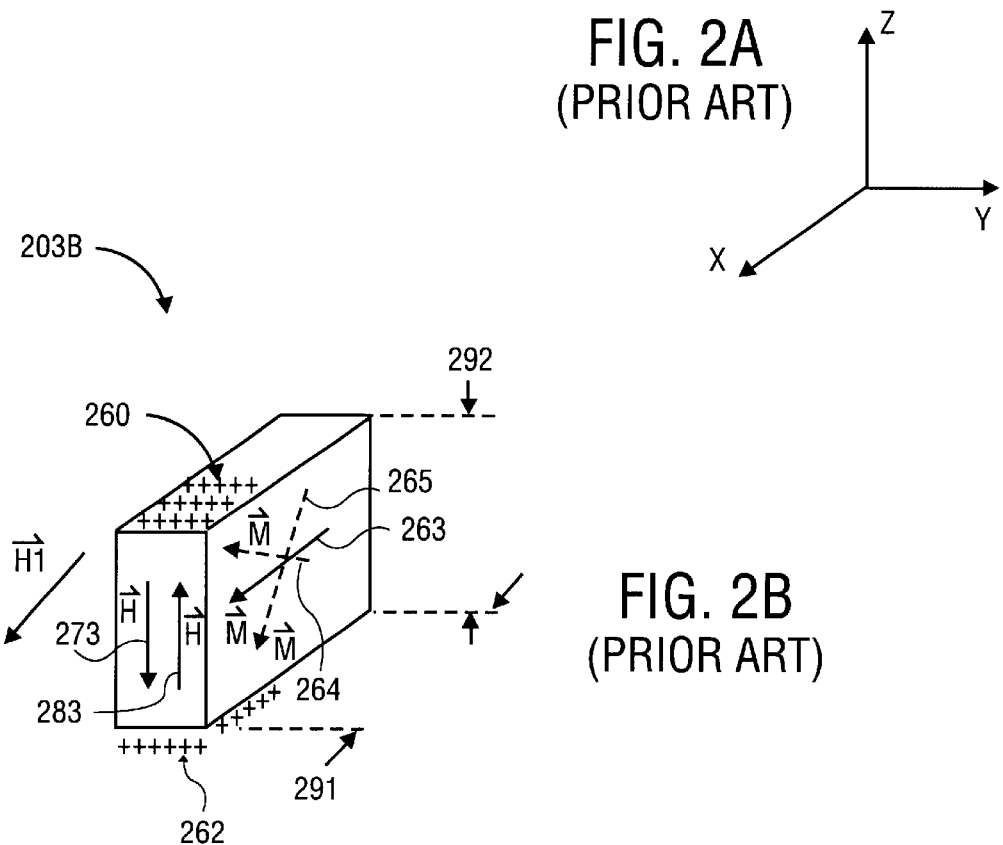

For proper operation, referring to FIG. 2b which shows an isolated view of the free layer 203a of FIG. 2a, the magnetization direction of the free layer 203b is supposed to maintain a permanent vector component in the +x direction alone (note, however, that in other designs the magnetization direction of the free layer may have a permanent component in the −x direction). When the free layer 203b passes over a disk region that emanates flux in the +z direction, the magnetic moment rotates in the +z direction from its nominal position 263 to an "upward" angular position 264.

Similarly, when the free layer 203b passes over a disk region that terminates flux in −z direction, the magnetic moment rotates in the −z direction from its nominal position 263 to a "downward" angular position 265. However, the design of the sensor 200 of FIG. 2a is such that the magnetic moment of free layer 203b never rotates so far as to point parallel to the + or −z axis or into the −x direction. Such limited rotational behavior is said to be stable.

Central to the stable behavior of the free layer 203b is the role of pole densities 260, 262 that vary in magnitude depending upon the direction of the free layer 203b magnetic moment. In the depiction of FIG. 2b, as the magnetic moment of the free layer 203b rotates in an "upward" direction (e.g., angular position 264) pole density 260 increases its positive polarity. Pole density 260 helps to form a demagnetization field 273 in the −z direction that increases in intensity as the magnetic moment of the free layer 203b continues to rotate upward toward a position parallel with the +z axis. Note that the demagnetization field may 273 actually posses an angular position rather than be directed parallel to the z axis. However for purposes of a simplistic description, the demagnetization field 273 is assumed to be directed as shown in FIG. 2b.

As the magnetic moment of the free layer 203b rotates upward, the free layer's 203b internal energy increases since the magnitude of the demagnetization field 273 increases and the direction of the demagnetization field 273 becomes increasingly antiparallel to the direction of the free layer 203b magnetic moment. Since internal energy must be overcome by external energy (provided by the flux lines emanating from the disk in the +z direction) to rotate the moment even further, the flux lines emanating from the disk face an increasing energy barrier as they continue to force the upward rotation of the free layer 203b magnetic moment.

The sensor 200 of FIG. 2a is therefore designed such that the disk's flux lines do not possess enough energy to rotate the free layer 203b moment to a position having a −x vector component. Similarly, as disk flux lines terminating in the −z direction continue to rotate the free layer moment in a "downward" position (e.g., angular position 265), pole density 262 increases in positive polarity. These poles 262 help form a demagnetizing field 283 in the +z direction and a corresponding energy barrier that prevents the flux lines from rotating the magnetic moment parallel with the −z axis. Again, the sensor 200 of FIG. 2a is designed such that the disk's flux lines do not possess enough energy to rotate the free layer 203b moment to a vector position having a −x component.

A stable free layer 203b design stems from the parameters involved in the aforementioned energy barrier. These include: 1) the magnetic moment per unit volume of the free layer 203b material(s); 2) the width 291 of the free layer 203b (which is approximately equal to the track width); 3) the height of the free layer 203b (also referred to as stripe height 292); and 4) other sensor design parameters that affect the biasing of the free layer 203b. One of these other design parameters is the magnitude of a biasing field H1 sent through the free layer 203b in the +x direction from a pair of permanent magnets (not shown for simplicity) located adjacent to both free layer 203b faces located parallel to the yz plane.

These parameters may be used to construct a free layer 203b with a certain aspect ratio. The aspect ratio of a free layer 203b is the ratio of the free layer's track width 291 to stripe height 292 (i.e, 291:292). A typical aspect ratio is approximately 1.50. However, due to potential limits in manufacturing technology, aspect ratios may fall below 1.50. The lapping techniques used to define the stripe height 292 of the sensor may run into repeatability problems as stripe heights 292 begin to fall under 0.50 μm.

Thus as track widths approach 0.50 μm and lower, reductions in the stripe height 292 may not be able to keep pace with improvements (i.e., reductions) achieved in track width 291. This may cause aspect ratios to be designed from 1.50 to 1.00 or below. Note, however, that sensors may be designed with aspect ratios below 1.50 even if stripe height 292 manufacturing limitations are not a concern. Thus the invention should not be construed as limited only to those applications where the stripe height dimension cannot be reduced further due to manufacturing limitations.

Referring to FIG. 2b, for a fixed track width 291, as the aspect ratio of the free layer 203b design falls the stripe height 292 increases. As stripe height 292 increases relative to track width (i.e., as aspect ratio drops), the aforementioned demagnetization fields in the −z and +z directions 273, 283 (that are respectively formed by pole densities 260, 262) decrease in magnitude.

Referring to FIGS. 2a and 2b, shields 250, 251 are typically formed of a conducting and magnetic material such as permalloy (Nife) and sendust (FeAlSi) which form image poles in response to the appearance of poles 260, 262. The magnitude of the image pole densities formed at shields 250, 251 correlate with the magnitude of the pole densities 260, 262 formed on the free layer 203a,b. The presence of image poles at the shields, reduce the demagnetizing fields 273, 283 within the free layer 203b.

Figure 3:
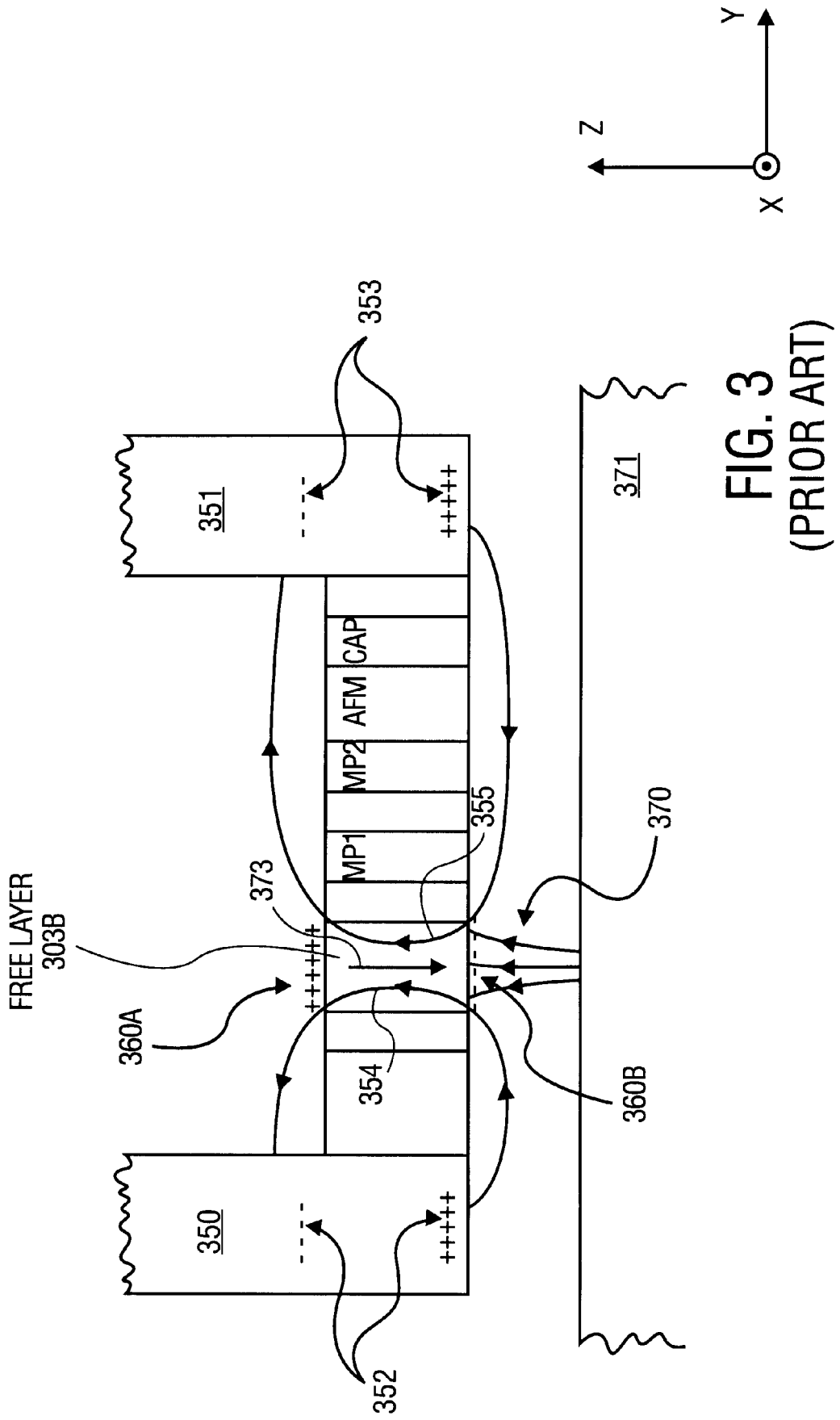

Referring to FIG. 3, flux 370 from the disk 371 rotates the magnetic moment of the free layer 203b "upward" in a +z direction, causing the formation of poles 360a,b on the surface of the free layer 303b and corresponding demagnetizing field 373 in the −z direction. In response to the presence of poles 360a,b the shields 350, 351 form image poles 352, 353. The flux lines 354, 355 from the image poles 352, 353 act to oppose the demagnetizing field 373 which lowers the aforementioned energy barrier.

Thus to review, there is an inherent decrease in free layer demagnetization field 373 that results from the relative increase in stripe height 292 with respect to track width 291 (i.e., increase in aspect ratio). This drop in demagnetization field 373 results in free layer stability becoming increasingly sensitive to the flux lines 354, 355 produced by the image poles 352, 353 at shields 350, 351. The reduced intensity of the demagnetizing force on the magnetic moment lowers the energy barrier discussed above and can cause free layer 303b to become unstable. As such, flux lines 370 from the disk 371 can cause the magnetic moment of the free layer 303b to have a vector component in the −x direction.

Figure 4:
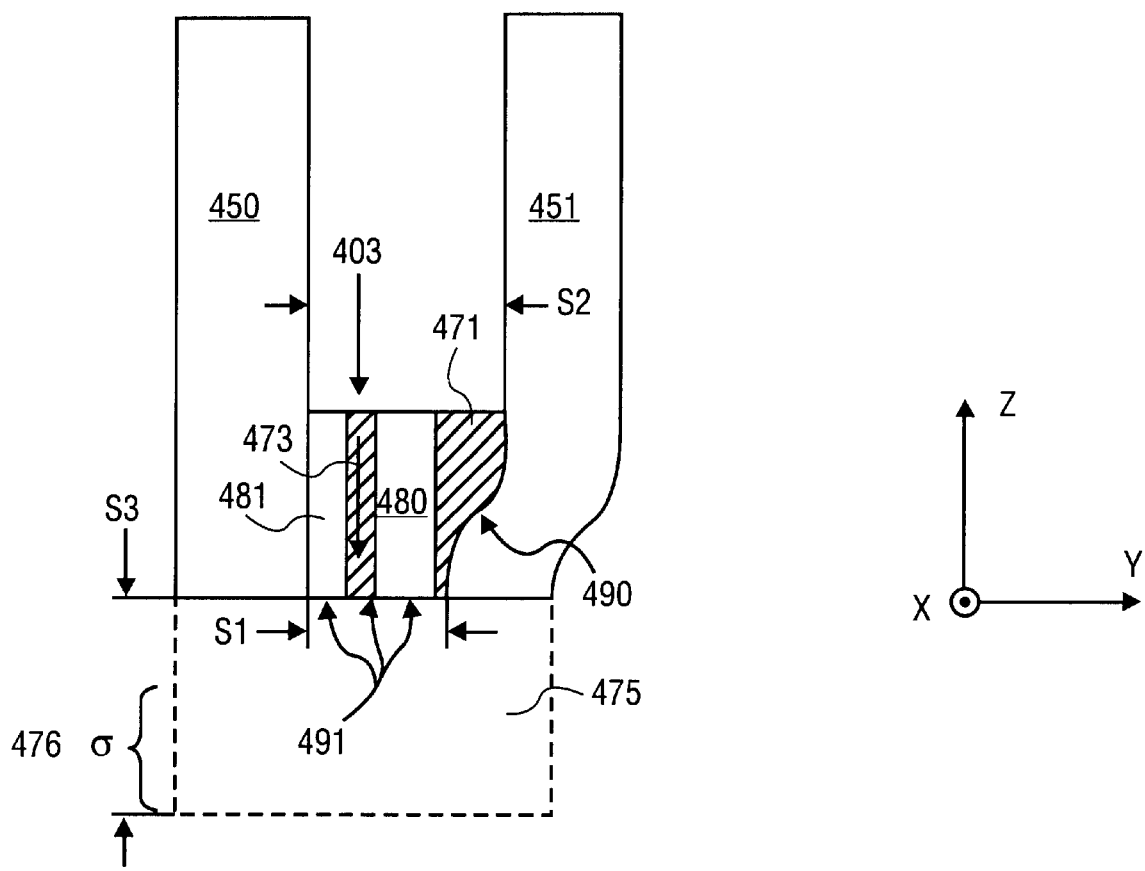
FIG. 4 shows an AP sensor having a varied gap between shield layers.

A design capable of avoiding the instability problem is shown in, FIG. 4. In FIG. 4, the sensor 400 is designed such that shield layers 450, 451 are separated from one another by two spacings S1,S2. A first spacing S1 corresponds to the thickness of the multilayer structure located between the shields 450, 451 at the sensor interface 491 to the disk (where thickness is measured along the y axis). For AP sensors, this distance corresponds to distances 190, 290 shown in FIGS. 1 and 2a. Spacing S1 should be sufficient to adequately protect a sensor from extraneous noise signals that can disturb the sensor's output signal for a particular linear bit density stored upon a disk.

Spacing S2 is designed to adequately reduce the effect on the free layer 403 demagnetization field 473 caused by the image poles 353 discussed with reference to FIG. 3. Comparing FIGS. 3 and 4, S2 extends the shield spacing beyond S1 so that flux lines 355 have less intensity within free layer 303, 403 than if S1 was equal to S2 (as seen in FIG. 3). As a result, the demagnetization field 473 within the free layer 403 of FIG. 4 will be greater than the demagnetization field 373 within the free layer of FIG. 3 (all other parameters being the same). This increases the aforementioned energy barrier making sensor stability issues easier to overcome.

Referring briefly back to FIG. 2, the thickness 290 of typical multilayer structures is currently around to 250 to 5000 Å. However, as linear bit density increases with technological advancement, multilayer structures having a thickness 290 below 250 Å are anticipated. Note that the present invention may be extended to advanced multilayer structures having a thickness below 250 Å. That is, referring to FIG. 4, spacing S2 may be set for any particular sensor embodiment designed to support a particular linear bit density stored upon the disk.

The initial tip length S3 should be greater than the lapping tolerance 476 of the manufacturing process used to form the head surface 491 facing the disk. That is, heads are typically formed initially with a larger tip 475 extending into the −z direction. The head surface 491 is obtained at its finished level by lapping off the extended tip region 475. In order to tightly control the S1 spacing in a manufacturable and repeatible process, final tip length S3 should be greater than the lapping tolerance 476 of the manufacturing process. Otherwise spacing S1 may undesireably increase toward S2.

Note that the structure 400, or variants thereof, may be applied in a number of different circumstances. First, a sensor with two shield spacings S1, S2 may be used in any head where reduced effects from image poles within the shields 450,451 is desirable. Although this may include sensors having free layer aspect ratios less than 1.50, the invention should not be construed as limited only to such cases. Various sensor design points (e.g., free, pinned or AFM layer material or thickness) may cause the strength of the demagnetizing field within the free layer to be of concern. The approach of increasing the distance between the shields beyond spacing distance S1 may be used to address any such concerns.

Figure 1:
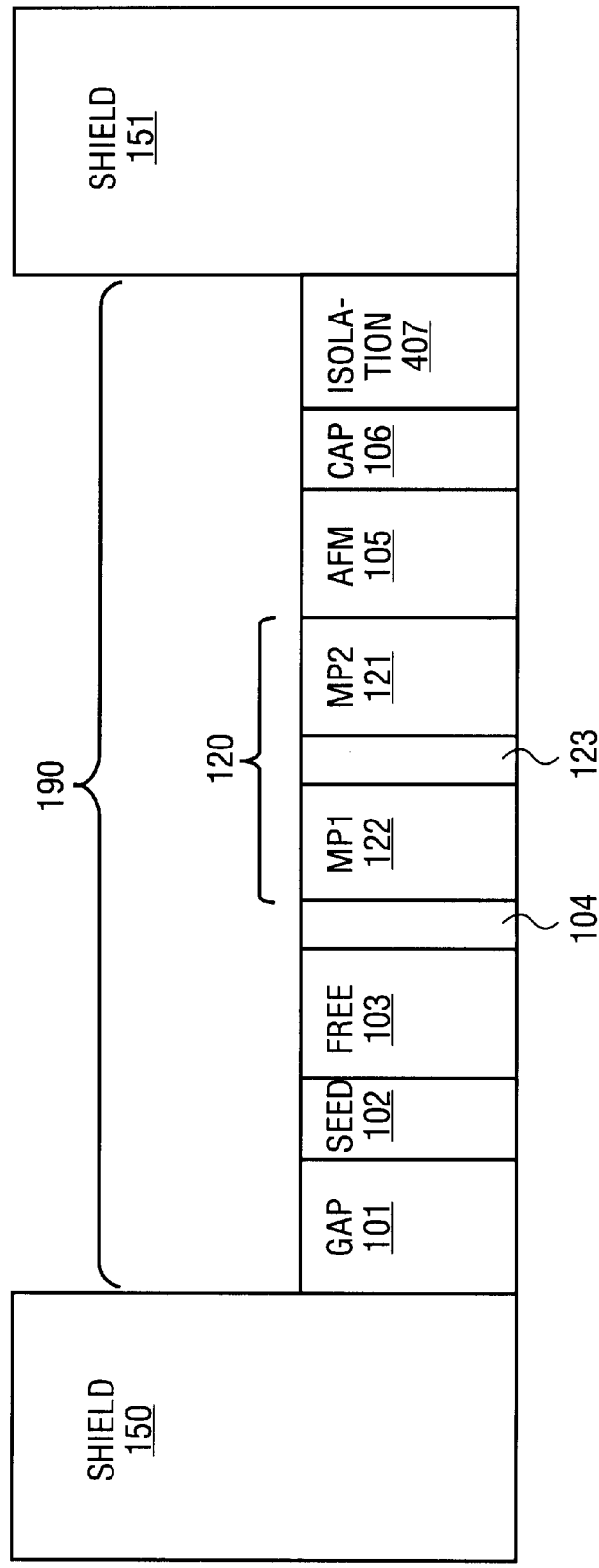
FIG. 1 shows a prior art AP sensor.

Note also that the approach of FIG. 4 may be extended to various MR head types besides the AP sensor type shown in FIGS. 1, 2a and 3. That is FIG. 4 refers to a free layer 403 between shields 450, 451. Regions 480, 481 may correspond to multilayer structures used to build other sensor types such as a simple spin valve (e.g., AP layer 120 of FIG. 1 is replaced by a non anti parallel material or structure), or dual spin valves (including those that use an AP pinned structure and those that do not). Dual spin valves typically comprise a structure having a free layer located between two antiferromagnetic layers (where other layers exist between the free layer and both AFM layers). Other sensor types not mentioned above may also utilize the advantage of separate shield spacings.

Furthermore, the approach herein may applied to "bottom" or "top" multilayer structures. "Top" multilayer structures form an AFM layer after the free layer is formed; while "bottom" multilayer structures form the AFM layer before the free layer is formed. Referring to FIG. 1, note the location of gap 101. Since gap 101 is used as a platform upon which the multilayer structure is formed, the multilayer structure 190 is constructed, layer by layer, in the +y direction. As such, FIG. 1 corresponds to a "top" AP sensor 100. A possible "bottom" AP sensor would form the AFM layer 105 over the gap 101 and then build a multilayer structure in substantially reverse order as compared to FIG. 1 (e.g., from MP2 121 through free layer 103) before adding the cap layer 106 and isolation layer 107.

For embodiments having an isolation layer (e.g., isolation layer 107, 207, 307 of FIGS. 1, 2a, 3) between the remainder of the multilayer structure and shield 451, region 471 of FIG. 4 corresponds to such an isolation layer. Thus, in such embodiments, the structure of FIG. 4 is implemented by forming an isolation layer 471 with a varying thickness that corresponds to the desired transition profile 490 between spacings S1, S2. Note that transition profile 490 may be viewed as continuum of spacings between spacings S1 and S2. Thus, the invention extents to embodiments having at least two spacings rather than only two spacings.

In one particular approach a "lift off" technique similar to those used to form thin film heads may be used to form isolation layer 471. Lift off techniques can be used to form the transition profile 490 of a layer having a varying thickness (where layer thickness is measured along the y axis). Typically, the profile 490 is constructed in an iterative layer by layer manner where each layer used to form transition profile 490 fills an opening beneath an upper photoresist layer, where the opening is formed in a lower photoresist layer. Note that isolation regions are typically an oxide such as $Al_2O_3$, NiMnO or $NiMgO_2$, among others.

Figure 5:
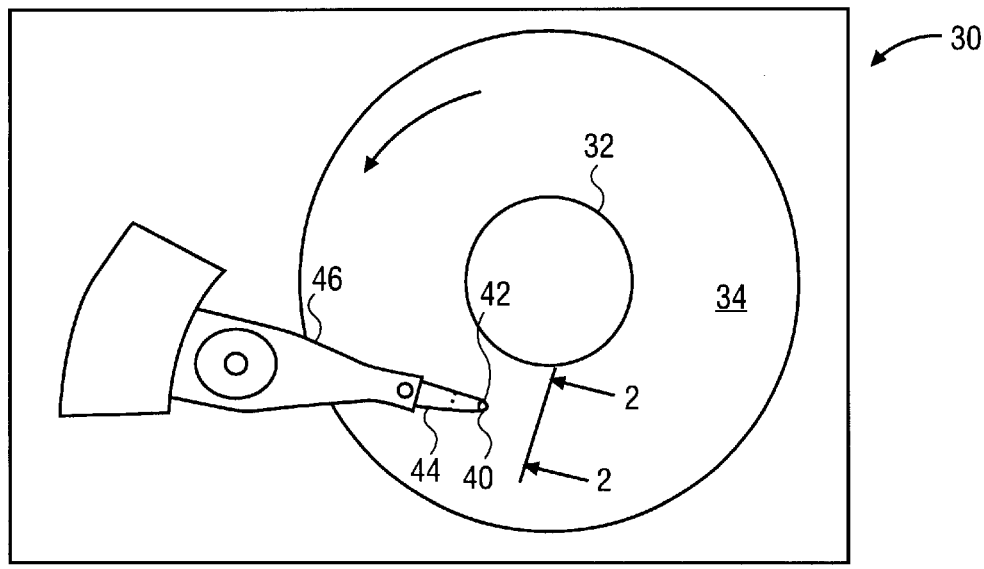
FIG. 5 shows a magnetic disk and activator.
Figure 6:
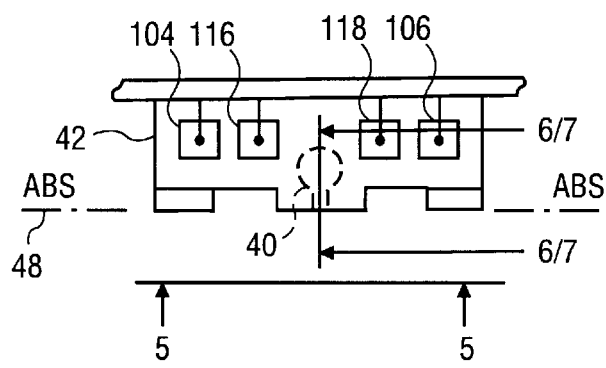
FIG. 6 shows an air bearing surface.
Figure 7:
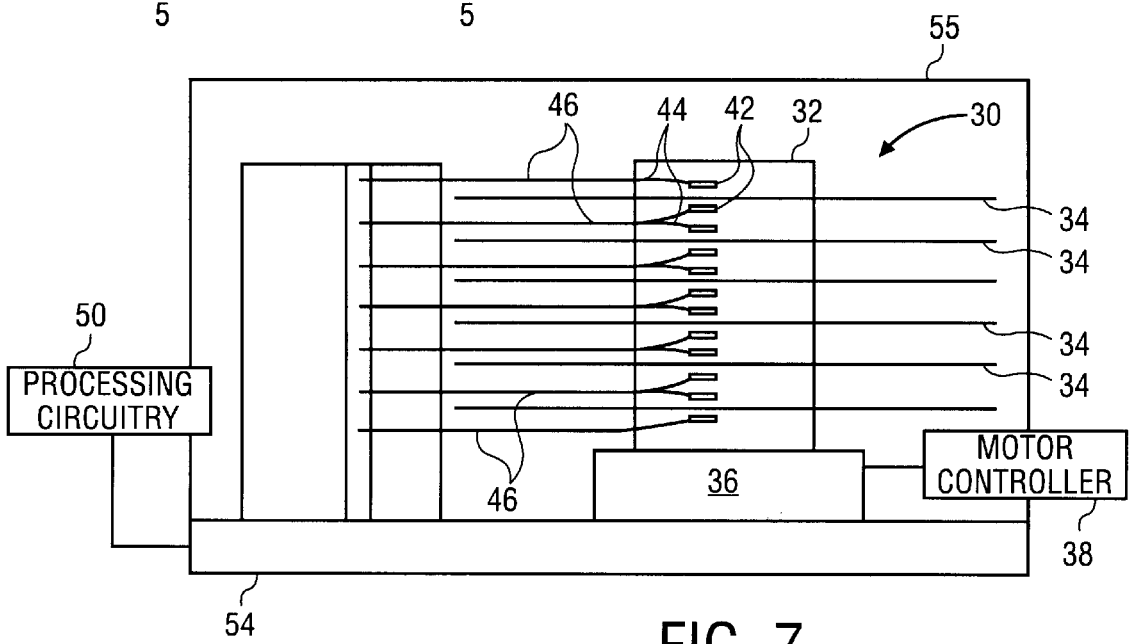
FIG. 7 shows a direct access storage device.

Referring now to the drawings wherein like reference numerals designate like or similar parts throughout the several views, FIGS. 5–7 illustrate a magnetic disk drive 30. The drive 30 includes a spindle 32 that supports and rotates a magnetic disk 34. The spindle 32 is rotated by a motor 36 that is controlled by a motor controller 38. A slider 42 with a combined read and write magnetic head 40 is supported by a suspension 44 and actuator arm 46. A plurality of disks, sliders and suspensions may be employed in a large capacity direct access storage device (DASD) as shown in FIG. 7. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks.

What is claimed is:

1. A magnetic head, comprising:
    a mnultilayer structure having a magneto resistive free layer, said multilayer structure positioned between a first shield and a second shield, said first shield having a first face that is adjacent to a first side of said multilayer structure, said second shield having a second face that is adjacent to a second side of said multilayer structure, said first and second sides of said multilayer structure being opposite sides of said multilayer structure such that said first face faces said second face, said first face separated from said second face by a first distance and a second distance, said first distance being a thickness of said multilayer structure where said multilayer structure interfaces to a magnetic disk, said first distance measured where said multilayer structure interfaces to a magnetic disk, said second distance being greater than said first distance.

2. The magnetic head of claim 1 wherein said second distance is tailored to reduce the effect of image poles within at least one of said shields upon a demagnetizing field within said free layer.

3. The magnetic head of claim 1 wherein said multilayer structure further comprises an anti-ferromagnetic layer.

4. The magnetic head of claim 3 wherein said multilayer structure further comprises a pinned layer whose magnetization direction is pinned via the influence of exchange coupling with said anti-ferromagnetic layer.

5. The magnetic head of claim 3 wherein said multilayer structure further comprises a pinned layer having a first ferromagnetic layer and a second ferromagnetic layer, said first ferromagnetic layer and said second ferromagnetic layer having opposite magnetization directions that are pinned via the influence of exchange coupling with said anti-ferromagnetic layer.

6. The magnetic head of claim 5 wherein said multilayer structure further comprises said magneto resistive free layer between a seed layer and said anti-ferromagnetic layer.

7. The magnetic head of claim 5 wherein said multilayer structure further comprises said anti-ferromagnetic layer between a seed layer and said magneto resistive free layer.

8. The magnetic head of claim 1 wherein said multilayer structure further comprises said magneto-resistive free layer between a first anti-ferromagnetic layer and a second anti-ferromagnetic layer.

9. The magnetic head of claim 1 wherein said free layer has an aspect ratio less than 1.50.

10. The magnetic head of claim 1 wherein said multilayer structure further comprises an oxide between a cap layer and one of said shield faces, said oxide having a thickness profile that corresponds to a transition profile between said first and second distances.

11. An apparatus, comprising:
 a) a magnetic disk; and
 b) a magnetic head configured to be positioned over said magnetic disk, said magnetic head comprising a multilayer structure having a magneto resistive free layer, said multilayer structure positioned between a first shield and a second shield, said first shield having a first face that is adjacent to a first side of said multilayer structure, said second shield having a second face that is adjacent to a second side of said multilayer structure, said first and second sides of said multilayer structure being opposite sides of said multilayer structure such that said first face faces said second face, said first face separated from said second face by a first distance and a second distance, said first distance being a thickness of said multilayer structure where said multilayer structure interfaces to said magnetic disk, said first distance measured where said multilayer structure interfaces to said magnetic disk, said second distance being greater than said first distance.

12. The apparatus of claim 11 wherein said second distance is tailored to reduce the effect of image poles within at least one of said shields upon a demagnetizing field within said free layer.

13. The apparatus of claim 11 wherein said multilayer structure further comprises an anti-ferromagnetic layer.

14. The apparatus of claim 13 wherein said multilayer structure further comprises a pinned layer whose magnetization direction is pinned via the influence of exchange coupling with said anti-ferromagnetic layer.

15. The apparatus of claim 13 wherein said multilayer structure further comprises a pinned layer having a first ferromagnetic layer and a second ferromagnetic layer, said first ferromagnetic layer and said second ferromagnetic layer having opposite magnetization directions that are pinned via the influence of exchange coupling with said anti-ferromagnetic layer.

16. The apparatus of claim 15 wherein said multilayer structure further comprises said magneto resistive free layer between a seed layer and said anti-ferromagnetic layer.

17. The apparatus of claim 15 wherein said multilayer structure further comprises said anti-ferromagnetic layer between a seed layer and said magneto resistive free layer.

18. The apparatus of claim 11 wherein said multilayer structure further comprises said magneto-resistive free layer between a first anti-ferromagnetic layer and a second anti-ferromagnetic layer.

19. The apparatus of claim 11 wherein said free layer has an aspect ratio less than 1.50.

20. The apparatus of claim 11 wherein said multilayer structure further comprises an oxide between a cap layer and one of said shield faces, said oxide having a thickness profile that corresponds to a transition profile between said first and second distances.

* * * * *